July 1, 1958  F. MÜLLER  2,841,385
ROTARY KILN

Filed Dec. 2, 1953  2 Sheets—Sheet 1

INVENTOR.
Franz Müller

July 1, 1958     F. MÜLLER     2,841,385
ROTARY KILN

Filed Dec. 2, 1953     2 Sheets—Sheet 2

INVENTOR.
Franz Müller

United States Patent Office 2,841,385
Patented July 1, 1958

2,841,385

ROTARY KILN

Franz Müller, Refrath, Bezirk Koln, Germany, assignor to Klöckner-Humboldt-Deutz Aktiengesellschaft, Koln-Deutz, Germany, a corporation of Germany Application December 2, 1953, Serial No. 395,710

Claims priority, application Germany December 19, 1952

2 Claims. (Cl. 263—33)

My invention relates to rotary kilns for the burning of cement raw material and has for its general object to provide simple and reliable means for returning into the kiln the dust carried away by, and precipitating from, the kiln exit gases.

To this end, and in accordance with a feature of my invention, I provide the feed end of a rotary kiln with a stationary flue structure serving to conduct the kiln exit gases upwardly to heat exchanging apparatus for preheating the cement raw material being fed into the kiln; and I give the lower end of the flue structure a trough- or spout-shaped portion that enters into the kiln and merges with an upwardly inclined back or bottom wall of the flue structure.

The foregoing and other objects, advantages and features of the invention will be apparent from the embodiments exemplified by the drawings in which.

Figure 1:
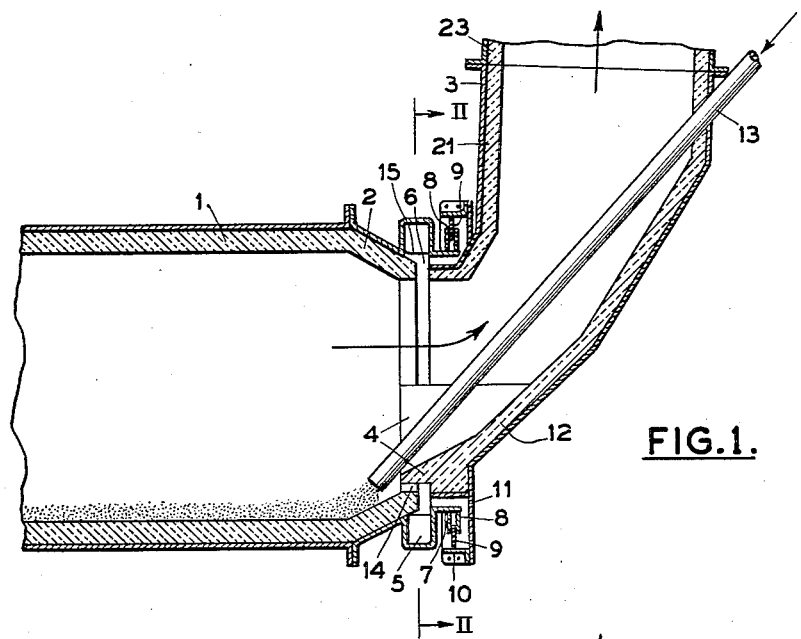
Fig. 1 is a vertical section of the feed end of a rotary kiln with an elbow-shaped flue structure according to the invention.

A rotary kiln for the burning of cement material is essentially an elongated cylinder revolvable about an axis somewhat inclined toward the horizontal, the pulverulent raw material being supplied to the higher end of the cylinder. As shown in Fig. 1, the feed end 1 of the kiln has a conical taper 2 at its extremity where the kiln chamber merges with the interior of a stationary flue structure 3. Structure 3 has substantially the shape of an elbow curving upwardly away from the kiln for passing the kiln exit gases to a vertically rising conduit 23 leading to a heat exchanging apparatus for preheating the raw material being fed into the kiln. The lower end of the flue structure has a projecting portion 4 shaped in the manner of a trough or spout and extending into the adjacent opening of the rotary kiln. The flue structure, like the rotary kiln structure 1, is lined with masonry or the like heat insulating material 21. The rear wall 12 of the flue structure is upwardly inclined and merges with the trough portion 4 so that the dust entrained by the escaping exit gases and precipitating therefrom will slide down along the sloping rear wall and through the trough portion back into the kiln. A material supply pipe 13 traverses the rear wall of the flue structure and extends down into the kiln to supply it with preheated raw material. As will be apparent, the dust precipitating within the flue structure or dropping out of the vertical gas conduit 23 is returned into the kiln in a simple and reliable manner without requiring the aid of any driven conveying mechanisms. In addition, the kiln according to the invention has the advantage of greatly minimized heat losses.

Figure 2:
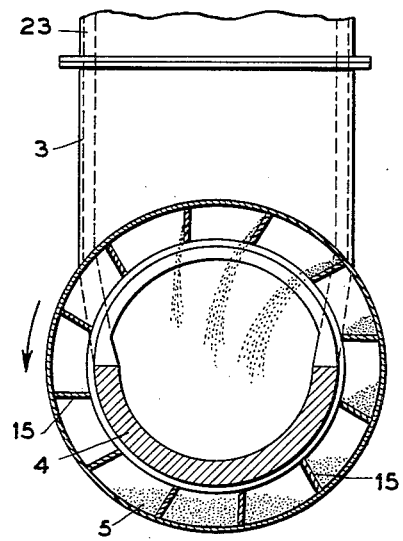
Fig. 2 is sectional front view of the flue structure, the section being taken in the vertical plane denoted by the line II—II in Fig. 1.

Mounted on the metal shell of the rotary kiln structure 1 is an annular housing 5 which bridges the gap between kiln and flue (Figs. 1, 2). A collar 7 attached to housing 5 carries two annular discs 8 closely spaced from each other. Another annular disc 9 located between the discs 8 is mounted on a split ring 10. Ring 10 is secured by screws to an annular support 11 joined with the stationary structure 3. The discs 8 and 9 form together a labyrinth gas seal for sealing the interior of the kiln from the atmosphere.

According to another feature of the invention, also embodied in the kiln shown in Figs. 1 and 2, the annular housing 5 is provided with lifting vanes 15 for returning into the kiln the amounts of dust that may escape through the gap 14 between the kiln lining and the trough portion 4 of the flue structure. During rotation of the kiln, the dust material located in the housing 5 is lifted by vanes 15 and, as apparent from Fig. 2, is discharged through the gap 6 into the trough portion 4 whence it returns into the kiln.

Figure 3:
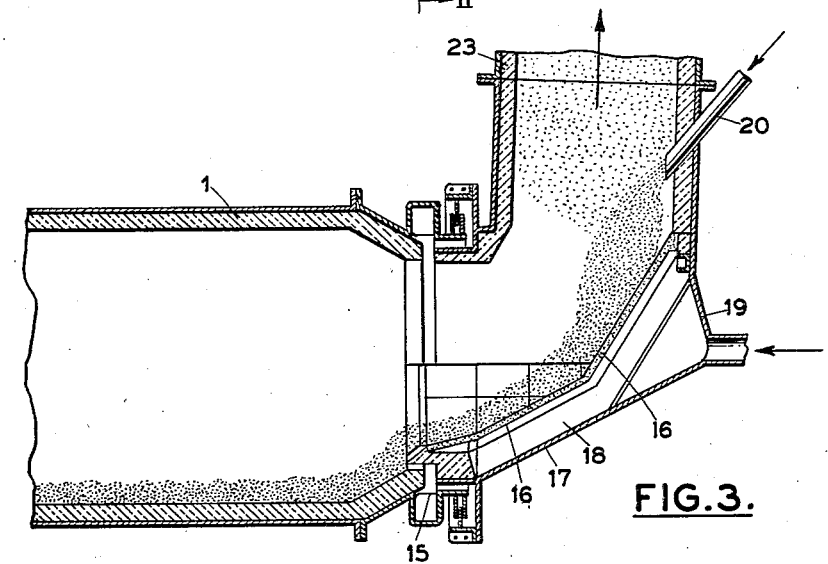
Fig. 3 is a vertical section of another embodiment of a kiln flue structure.

In the embodiment of Fig. 3, which in other respects is similar to that of Figs. 1 and 2, the sloping rear wall of the elbow-shaped structure is composed of gas-permeable plates 16 mounted in spaced relation to the exterior shell 17 of the structure thus forming an enclosed gas chamber 18. Chamber 18 has a connection 19 for the supply of compresssed air. During operation of the kiln the chamber 18 is kept under air pressure so that the plates 16 are continuously traversed by a finely distributed stream of air. The amount of dust collecting on plates 16 is thus aerated and fluidized so that it readily passes back into the kiln. The air supplied at 19 is preferably preheated and has a relatively low pressure. However, cold air may also be used without appreciable disadvantage because the amount of air passing through the permeable wall plates is rather slight.

In a kiln flue structure as shown in Fig. 3, the sloping rear wall can be given a smaller angle of inclination than is applicable with an embodiment of the kind shown in Fig. 1, and it is further preferable to have the material supply pipe 20 (Fig. 3) terminate close to the point where it enters into the flue structure so that all of the discharged material will pass over the gas-permeated wall plate 16.

In kiln flue structures with a permeable wall and an air pressure chamber, the lowermost portion of the rear wall may also be given a horizontal or an only slightly inclined position. The dust precipitating within the elbow space or out of the gas conduit 23, and, as the case may be, also the cement material issuing from the supply pipe if that pipe is arranged as shown in Fig. 3, then collect upon the horizontal or nearly horizontal wall surface. The air flowing through the permeable wall portion into the material has a slight lifting and loosening effect which renders the material sufficiently fluent to reliably drain off into the kiln.

Figure 4:
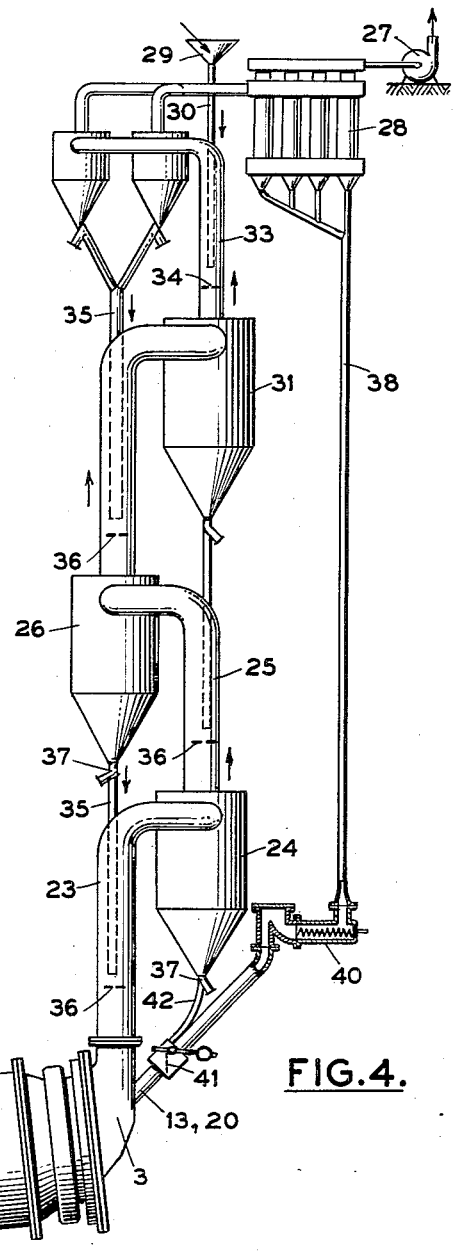
Fig. 4 shows schematically a complete plant for the fabrication of cement material, including a rotary kiln according to the invention.

Fig. 4 shows a kiln according to the invention in connection with apparatus for preheating the cement raw material by the heat of the waste gases passing through the flue structure of the kiln. The preheating apparatus comprises a number of centrifugal separators (cyclones) arranged in two vertical rows. The gas conduit 23 connected to the flue structure 3 leads to the tangential gas inlet of a cyclone 24. The clean gases leaving the cyclone 24 pass through a conduit 25 to the tangential inlet of the next upper cyclone 26. Cyclone 26 lies coaxially above the flue outlet conduit 23. The gases leave the cyclone 26, pass serially through a cyclone 31 axially above the cyclone 24 and through a twin cyclone 32 disposed above the cyclone 26. The gases thus pass through a series of four cyclones before they are exhausted by means of a blower 27 through a dust collection system 28.

The cement raw material enters from a bin through a funnel 29 and a supply pipe 30 into the gas conduit 33 leading to the inlet of the uppermost cyclone 32. The material drops upon a disc 34 mounted in conduit 33 and flows over the disc periphery into the ascending gas stream which entrains the material upwardly and into the cyclone 32. The material precipitating from the gas in cyclone 32 passes through a pipe 35 into the gas conduit leading to the cyclone 31 and is distributed into the ascending gas stream by means of another disc 36. The material thus entrained into the separator 31 leaves that separator through a discharge pipe 35 and enters into the gas conduit 25 where the material is again distributed by a disc 36 for entrainment by the ascending gas stream passing into the separator 26. From separator 26 the cement material is discharged through another pipe 35 into the gas exit conduit 23 from which it reaches the lowermost separator 24. Any coarse inclusions in the material or any pieces of lining or masonry that may split off from the insulating lining of the cyclones drop shortly beneath each cyclone onto a screened partition which is downwardly inclined to guide such inclusions into a normally closed stub pipe 37 from which such inclusions can be removed from time to time.

During its passage through the preheating apparatus, the cement raw material gradually assumes a higher temperature, being repeatedly mixed with the kiln gases in the gas conduits, and being repeatedly whirled in the separators while in intimate contact with the gases. The hot material precipitating in the lowermost separator 24 leaves through a pipe 42 and passes through the feed supply pipe 13 (see Fig. 1) or 20 (see Fig. 3) into the stationary flue structure 3 of the kiln as described in the foregoing. The slight amount of dust still contained in the spent gases leaving the uppermost separator 32 is precipitated in the dust collector 28 and passes back into the kiln through a pipe 38 connected with the feed pipe 13 or 20 of the kiln. A gas seal 40 between the dust return pipe 38 and the feed pipe of the kiln prevents the kiln gases from bypassing the preheating apparatus through the dust collector 28. The dust pipe 42 and the pipe coming from the sealing device 40 enter into a lock-type device equipped with a weighted, pendulous flap valve 41 which provides an additional gas seal and prevents the kiln gases from bypassing the gas conduit 23 through the dust pipe 42. The sealing device 40, as shown, may comprise a driven feed screw 40 that forces the material over an overflow edge located above the cross-section of the feed screw housing so that an amount of dust is always retained in the sealing device to provide the desired seal.

It will be understood by those skilled in the art, upon a study of this disclosure, that rotary kilns according to my invention may be modified in various respects and can be given designs or may be used for purposes other than those specifically mentioned in this disclosure, without departing from the essence of my invention or within the scope of the claims annexed hereto.

I claim:
1. A kiln for processing granular material such as cement, comprising a rotary kiln structure having an open feed end, a stationary flue structure adjacent to said feed end of said kiln structure and extending upwardly away therefrom, said kiln structure and said flue structure forming together an annular gap at said feed end, said flue structure having a bottom portion projecting across said gap into said kiln structure along only part of the periphery of said gap so as to form an upwardly open spout, said bottom portion having an inner surface inclined downwardly toward said kiln structure, said flue structure having an upwardly sloping rear wall merging with said bottom portion, said rear wall and said bottom portion being formed of porous gas-permeable material, a gas plenum chamber extending behind and immediately adjacent to said rear wall and said bottom portion for passing gaseous medium therethrough, a dust-material supply pipe entering from the rear into said flue structure at a place above said rear wall, an annular housing surrounding said gap and being mounted on said kiln structure to rotate together therewith, and peripherally distributed lifting vanes mounted in said housing around said gap for conveying onto said bottom portion any material dropping into said gap.

2. A kiln for processing granular material such as cement, comprising a rotary kiln structure having an open feed end, a stationary flue structure adjacent to said feed end of said kiln structure and extending upwardly away therefrom, said kiln structure and said flue structure forming together an annular gap at said feed end, said flue structure having a bottom portion projecting across said gap into said kiln structure along only part of the periphery of said gap so as to form an upwardly open spout, said bottom portion having an inner surface inclined downwardly toward said kiln structure, an annular housing firmly mounted on said kiln structure to rotate together therewith and surrounding said gap, sealing means disposed between said housing and said flue structure, and a peripherally distributed number of lifting vanes mounted in said housing around said gap to rotate together with said housing for conveying onto said bottom portion any material dropping into said gap.

References Cited in the file of this patent
UNITED STATES PATENTS

| 301,513 | Newton | July 8, 1884 |
| 1,011,804 | Jones | Dec. 12, 1911 |
| 1,243,892 | Strong | Oct. 23, 1917 |
| 1,385,402 | Schlaupitz | July 26, 1921 |
| 1,468,168 | Pike | Sept. 18, 1923 |
| 1,914,462 | Ronne | June 20, 1933 |
| 2,024,453 | Vogel-Jorgensen | Dec. 17, 1935 |
| 2,111,783 | Hults | Mar. 22, 1938 |
| 2,190,234 | Hasselbach | Feb. 13, 1940 |
| 2,492,792 | Ford | Dec. 27, 1949 |
| 2,657,100 | Weller | Oct. 27, 1953 |

FOREIGN PATENTS

| 51,926 | Denmark | July 27, 1936 |
| 642,426 | Great Britain | Sept. 6, 1950 |